(12) United States Patent
Thomason (10) Patent No.: US 6,317,039 B1
(45) Date of Patent: Nov. 13, 2001

(54) WIRELESS VIDEO AUDIO DATA REMOTE SYSTEM

(76) Inventor: John A. Thomason, 1914 Stonegate, Denton, TX (US) 76205

( * ) Notice: Subject to any disclaimer, the term of this patent is extended or adjusted under 35 U.S.C. 154(b) by 0 days.

(21) Appl. No.: 09/175,112

(22) Filed: Oct. 19, 1998

(51) Int. Cl.[7] .............................. G08B 26/00; H04N 7/18
(52) U.S. Cl. ...................... 340/505; 340/539; 340/531; 340/506; 348/143
(58) Field of Search .................................. 340/505, 539, 340/531, 825.69, 825.72, 506; 348/143; 379/37–40

(56) References Cited

U.S. PATENT DOCUMENTS

| | | | |
|---|---|---|---|
| H1790 | 3/1999 | Coleman | 348/14 |
| Re. 34,895 | * 4/1995 | Morotomi et al. | 348/156 |
| 3,919,475 | 11/1975 | Dukich et al. | 178/7.91 |
| 4,605,959 | 8/1986 | Colbaugh | 455/606 |
| 4,750,197 | * 6/1988 | Denekamp et al. | 340/825.35 |
| 4,962,473 | * 10/1990 | Crain | 340/341 |
| 5,452,289 | 9/1995 | Sharma et al. | 370/32.1 |
| 5,546,072 | * 8/1996 | Creuseremee et al. | 340/574 |
| 5,619,183 | 4/1997 | Ziegra et al. | 340/505 |
| 5,671,158 | 9/1997 | Fournier et al. | 348/838 |
| 5,697,834 | 12/1997 | Heumann et al. | 451/440 |
| 5,726,660 | 3/1998 | Purdy et al. | 342/357 |
| 5,793,416 | 8/1998 | Rostoker et al. | 348/17 |
| 5,801,755 | 9/1998 | Echerer | 348/13 |
| 5,810,747 | 9/1998 | Brudy et al. | 600/595 |
| 5,812,054 | * 9/1998 | Cohen | 340/506 |
| 5,917,405 | * 6/1999 | Joao | 340/426 |

* cited by examiner

Primary Examiner—Donnie L. Crosland
(74) Attorney, Agent, or Firm—John G. Fischer (57) ABSTRACT

A method and system for remote assistance and review of a technician or multiple technicians, in real time, working with equipment of various complexity. A technician or multiple technicians at a remote location are coupled by a wireless means to an advisor at a local station, so that the advisor may view and hear the same stimuli as the technician, that the advisor and technician may communicate. The technician has limited training or otherwise in need of support, and may be a field engineer, technician or maintenance personnel. The advisor has extensive training and able to provide technical support, and generally has extended and specialized knowledge with regard to the remote apparatus, and may be a technical expert on the remote apparatus. The technician may comprise an individual or group with technical training and knowledge, but lacking managerial or other authority, while the advisor comprises an individual or group with such authority. The technician communicates with the advisor by visual cues or ordinary speech, while the advisor views and listens to the remote apparatus. The advisor gives advise to the technician for manipulating or repairing the remote apparatus. Alternatively, an intermediate advisor may advise the technician and be advised by a higher-level advisor.

13 Claims, 6 Drawing Sheets

WIRELESS VIDEO AUDIO DATA REMOTE SYSTEM

BACKGROUND OF THE INVENTION

1. Field of the Invention

This invention relates to a wireless video audio data remote system.

2. Description of Related Art

The nature of business organizations and their employees is generally such that, in most any subject, there are a relatively small number of persons with extensive training and experience (e.g., "experts") and a relatively large number of persons with only limited training and experience (e.g., technicians. This problem is exacerbated by the relatively larger costs associated with the former. Accordingly, when a business organization seeks to apply a person's skills to a problem, it is often faced with the fact that persons with the extensive training and skill are a scarce resource.

With many problems, and in particular with the problem of servicing and trouble-shooting equipment, experience shows that the most tasks require only a subset of the full experience that characterizes experts in the field, and that those tasks can be adequately carried out by entry-level technicians. However, when a technician is confronted with a task requiring an expert, often the only indicator thereof is the technicians inability to solve the problem. Sometimes the technician's lack of extensive knowledge can actually make the problem worse. These effects serve to increase the cost, time, effort, and frustration associated with the servicing and trouble-shooting equipment.

One method in the prior art has been to advise technicians at a fixed location using audio video and data transmission over various wired networks. An example of this is U.S. Pat. No 5,619,183 (Ziegra et al.). The main disadvantage of that fixed-site system is that remote-site technician oversight is impractical when a mobile work force requires video, audio and data transmission from continually changing job site locations. Another disadvantage is that the fixed-site to fixed-site system software does not fully utilize the idea of "leveraged expertise".

Accordingly, it would be advantageous to provide a method and system by which technicians can perform the tasks they are adequately trained for, in a wireless environment, while allowing experts to assist them when expert assistance is required.

SUMMARY OF THE INVENTION

The invention provides a method and system for remote assistance and review of a technician or group of technicians working with equipment of various complexity. In a preferred embodiment, a technician at a remote job site is coupled to an advisor manning a local station (where "local" and "remote" are relative to a remote apparatus being controlled or serviced by the technician, and do not necessarily denote large distance), in such manner that the advisor may view and hear the same stimuli as the technician and that the advisor and technician can communicate.

In a preferred embodiment, a technician at a remote job site may be coupled by a wireless communication link(s) to a local station. The technician at the remote job site wears an apparatus consisting of a video and audio sensor, such as a camera and a microphone, and a receiver for the communication link such as earphone or speaker and a wireless portable data processor. The communication link comprises a wireless communication path to/from the local station, and may further comprise data encoding, compression, and error correction/detection devices. The local station comprises a video and audio display, such as a monitor and a speaker, software that allows for real-time communication to multiple technicians, and a transmitter for the communication link with the remote job site, such as a microphone.

In a preferred embodiment, the technician may comprise an individual or group with limited training or otherwise in need of support, such as a field engineer or technician. The technician(s) should generally know how to operate the remote job site apparatus, but need not have extended or specialized knowledge with regard thereto. The advisor may comprise an individual or group with extensive training and able to provide technical support, who generally does have extended and specialized knowledge with regard to the remote job site apparatus, such as a technical expert on the remote job site apparatus. In an alternative embodiment, the technician(s) may comprise an individual or group with technical training and knowledge, but lacking managerial or other authority, while the advisor(s) comes an individual or group with such authority.

In a preferred embodiment, the technician(s) couples the remote job site communication apparatus to the wireless communication link(s) and to the local station communication apparatus. The technician(s) may communicate with the advisor(s) by visual cues or ordinary speech, while the advisor(s) may view and listen to the remote job site apparatus. The advisor(s) may give advice to the operator for manipulating the remote job site apparatus, and may manipulate the remote job site apparatus directly by means of the control signal or data signal feeds. Thus, the technician(s) may service/repair/operate the remote job site apparatus as if the advisor were peeking over his shoulder.

In an alternative embodiment, an intermediate advisor may advise/control the technician(s) and be advised/controlled by a higher-level advisor.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of available general purpose computers to implement the process steps and data structures described herein would not require undue invention.

GENERAL FEATURES OF THE METHOD AND SYSTEM

Figure 1:
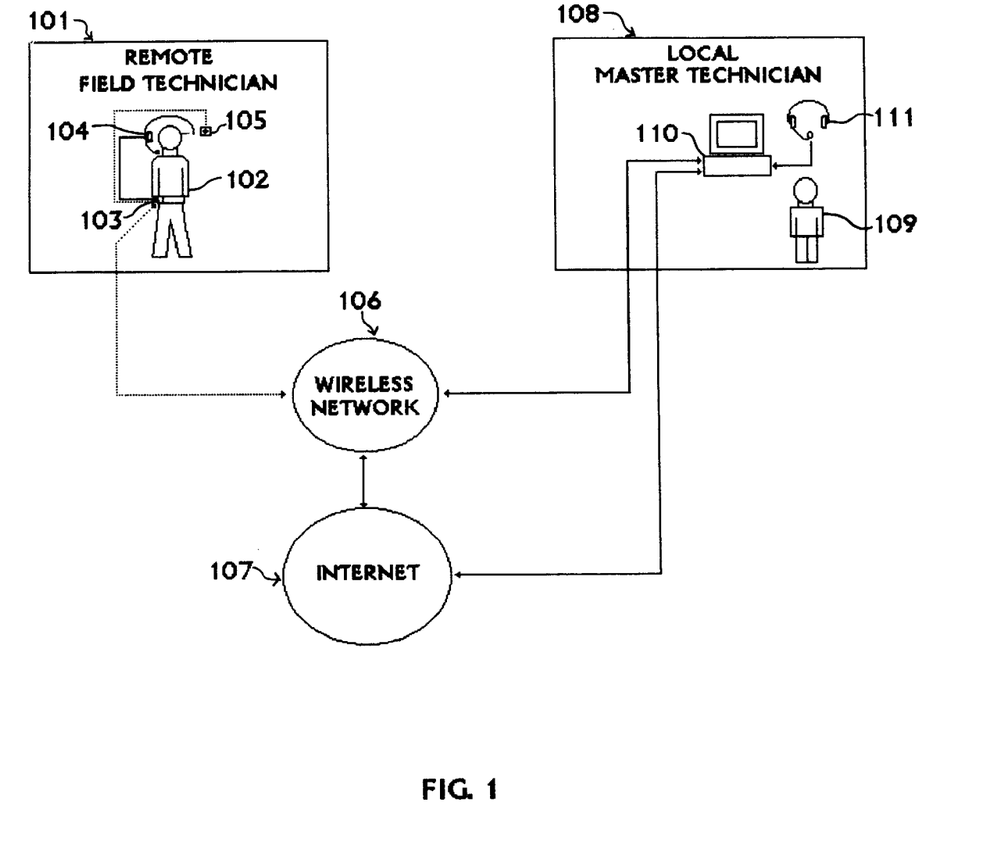
FIG. 1 shows a block diagram of a wireless remote system

FIG. 1 shows a block diagram of a wireless remote system.

A wireless remote system 101 comprises a mobile field technician 102 at a remote job site utilizing a wireless portable processor 103 and a wireless audio headphone/ microphone 104 and a wireless camera 105 coupled by a wireless network 106 to the local station 108 and being advised by the local master technician 109.

The local station 108 is comprised of a local processor 110 and the local master technician audio/microphone headset 111 utilized by the local master technician 109.

As described herein, the mobile field technician 102 may operate/service/maintain an apparatus at a remote job site with the advice and control of the local master technician 109:

(a) The local master technician 109 may view and hear the same stimuli at the remote site as the mobile field technician 102, by means of audio and video sensors at the remote job site.

(b) The mobile field technician 102 may communicate with the local master technician 109 by means of the wireless network 106.

(c) The mobile field technician 102 may communicate with the local master technician 109 by means of the wireless network 106 and/or by means of the Internet 107.

As used herein, "local" and "remote" are relative to logical control of the remote job site apparatus and do not necessarily denote large distance. For example, the remote job site and the local station 108 may be located in the same building or even in the same room, where it is desired to logically separate the function of the mobile field technician 102 and the local master technician 109 as in a local training environment. Similarly, the mobile field technician 102 need not be physically co-located with the remote job site apparatus where it is desired to control that remote job site apparatus by means of physically distant tools and software.

In a preferred embodiment, remote air conditioning system control software such as Parker Controls VVT system would allow a mobile field technician 102 to make adjustments to a facility's hvac system with guidance from the local master technician 109 without either of them physically being at the job site.

REMOTE WIRELESS SYSTEM COMPONENTS

Figure 2:
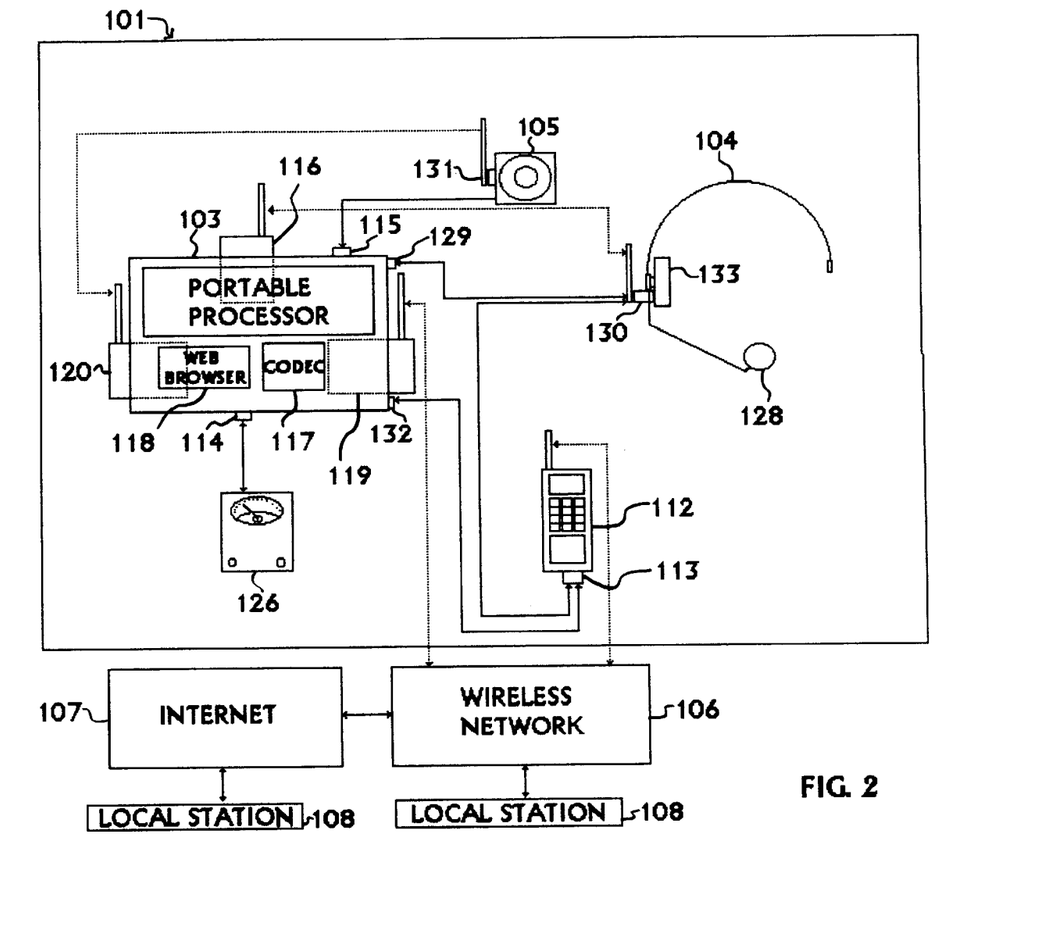
FIG. 2 shows a block diagram of wireless portable communication apparatus for a remote system.

FIG. 2 shows a block diagram of the portable components of the wireless remote system.

The mobile field technician 102 wears a group of components that comprise a wireless remote system 101. The wireless remote system 101 is comprised of a wireless portable processor 103 an earphone headset 104 a microphone 128 and a video sensor/camera 105. In a preferred embodiment, the wireless portable processor 103 is of sufficient size and weight to be worn by the mobile field technician 102 and has an embedded web browser 118 to allow for wireless connection to the Internet 107, an embedded codec 117 for audio/video data compression, a wireless modem 119, to connect to the wireless network 106, a wireless RF video receiver 120, a wireless RF audio transceiver 116, a data input jack 114, to receive data from a testing meter 126, an audio input jack 129 to alternatively connect to the wireless earphone headset 104, and a video input jack 115, to alternatively connect to the video sensor/camera 105, and a communication port 132, to alternatively connect the wireless portable processor 103, to a cellular phone 112, that would alternatively couple the wireless remote system 101, to the wireless network 106.

In a preferred embodiment, the wireless earphone headset 104, comprises a set of headgear or a helmet suitable for wearing by the mobile field technician 102, having the microphone 128 and the video sensor/camera 105 attached thereto or embedded therein, in suitable locations relative to the mobile technician's ears, eyes, and mouth. For example, the wireless earphones 104 are preferably disposed near the mobile field technicians ears, the wireless camera 105 is preferably disposed near the side of the mobile field technician's head and pointed ahead at a center-of-vision line relative to the operator's head, and the microphone 128 is preferably disposed near the mobile field technicians mouth. Alternatively, the wireless camera 105 may be detached from the headset 104 and placed at a distance from the mobile field technician 102, in such a manner as to provide the local master technician 109 a larger field of view while mounted to a stationary platform.

In a preferred embodiment, the wireless earphone headset 104 would comprise a microphone 128 for voice communication with the local master technician 109, an earphone 133 for use on one ear by the mobile field technician 102, and a wireless transceiver 130 to couple with the wireless headphone transceiver 116. Alternatively, the earphone headset 104 could be coupled to the wireless portable processor 103 by means of wired connection to the audio imput jack 129.

In a preferred embodiment, the wireless earphone headset 104 comprise the NCHSM-776 product, by Specialty Products, Inc., of Reno, Tex. p.o. box 30665, and the GRT-1001 transceiver product, by Polaris Industries, Inc., of 470 Armour Drive, Atlanta Ga. The NCHSM-776 product is a combination earphone headset 104 and a noise canceling microphone 128. In an alternative embodiment, the wireless earphone headset would have a jack for a wired connection to the wireless portable processor 103. In an alternative embodiment, the wireless earphone headset 104 would be coupled to a cellular phone 112 and operate independently of the wireless portable processor 103.

In a preferred embodiment, the video/sensor camera 105 would be detachable from the wireless earphone headset 104 and would comprise a camera 105 and a wireless RF video transmitter 131. The wireless RF video transmitter 131 would be wirelessly coupled to an RF receiver 120 that would be mechanically coupled or embedded to the wireless portable processor 103. Alternatively, the camera 105 and the wireless earphone headset 104 would use the same transceiver 116 in a dual band mode and thus only need one.

In a preferred embodiment, the video/sensor camera 105 would comprise the SCI-VC-600 color board camera product, by Synergy Concepts Inc., of P.O.box 803089 Dallas Tex. 75380-3088 and a wireless RF video transmitter 131 model GRT1001 by Polaris Industries, Inc., of 470 Armour Drive, Atlanta Ga.

In a preferred embodiment, the camera 105 can be configured to alternatively provide high-resolution still images in place of continuous video images, represented by an analog video signal in a standard format.

In a preferred embodiment, the camera 105 would be detachable from the wireless earphone headset 104 and be functionally independent.

In a preferred embodiment, the wireless portable processor 103 comprise the 220E product hand held computer, by Hitachi Inc., of 2000 Sierra Point Parkway, Brisbane, Calif. 94005-1835.

In a preferred embodiment, the wireless portable processor 103 would be worn on a belt pack or on a backpack coupled alternatively to an external battery pack that would be worn on a belt pack or a backpack.

An output of the camera 105 is wirelessly coupled to a local video codec 117, which digitizes the video signal output by the camera 105, to produce a stream of digital video data. In a preferred embodiment, the local video codec 117 also compresses the digital video data using a wave let full color motion compression algorithm performed in real time. In a preferred embodiment, the local video codec 117 comprise the HARC-C compression engine product, by Houston Advanced Research Center, Inc., of 16800 Greenspark Drive, Ste 140 North, Houston, Tex. 77060. However, in an alternative embodiment, the local video codec 117, may use another video compression standard, such as the MPEG I or MPEG II compression standard. The MPEG I and or the MPEG II compression standards are known in the art.

The wireless portable processor 103 utilizes a web browser 118 software to access the Internet 107. In a preferred embodiment, the web browser 118 would comprise the Netscape 4.0 product, by Netscape Inc. 501 E. Middlefield Rd., Mountain View, Calif. 94043.

The wireless portable processor 103 is mechanically coupled to or has embedded within, a wireless modem 119. The wireless modem 119 is coupled by a wireless means to the wireless network 106 which may be coupled to the Internet 107. The audio/video data from the wireless portable processor 103 can be coupled alternatively via the wireless network 106 and/or the Internet to the local station 108. In a preferred embodiment, the wireless modem 119 comprise the Type III PCMCIA CDPD modem, by Inot of 1255 W. 15th. St., Plano Tex. 75075-7270. In a preferred embodiment, the wireless modem 119 would be connected to the wireless portable processor via a PCMCIA slot. Alternatively, the wireless portable processor 103 would be coupled to the wireless network 106 via a cabled connection to a cellular phone 112. In a preferred embodiment, the cellular phone 112 would comprise a model 2160i by Nokia Corp., of 6000 Connection Dr., Irving, Tex. 75039.

THE LOCAL STATION

Figure 3:
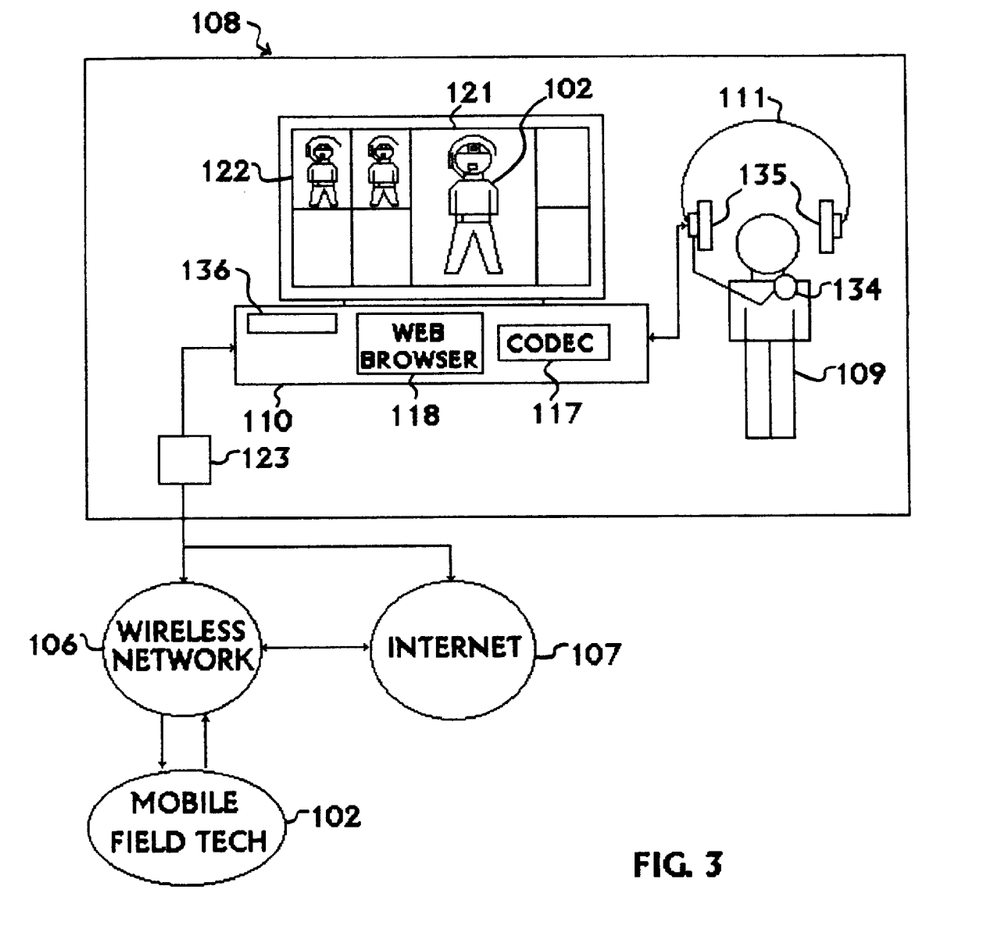
FIG. 3 shows a block diagram of a local station for a wireless remote system.

FIG. 3 shows a block diagram of a local station 108 for a remote system.

The local station 108 comprises an operator headset 111, including earphones 135 and a microphone 134, a local processor 110, local station software 136, a local station data interface 123 and a local master technician 109.

In a preferred embodiment, the local master technician 109 would don the operator headset 111 and couple the local processor 110 to the wireless network 106 and/or the Internet 107 via a web browser 118 and the local station data interface 123.

In a preferred embodiment, the local station 108 would be coupled by a wireless means to the wireless portable processor 103 and the mobile field technician 102 via the wireless network 106 and/or the Internet 107.

In a preferred embodiment, the local master technician 109 would communicate with the mobile field technician 102 via normal speech and visual signals. The local master technician 109 would view the visual signals from the mobile field technicians' camera 105 on the video monitor of the local processor 110 and hear the audio/speech from the mobile field technician 102 using the earphones 135 and give direction to the mobile field technician 102 via the microphone 134.

In a preferred embodiment, the local processor 110 would comprise a computer of sufficient capacity to allow for a plurality of audio/video signals from a plurality of mobile field technicians 102 to be processed simultaneously. The local station software 136 would utilize a plurality of video windows that would contain the video signals from the individual mobile field technicians' cameras 105. When activated by the local master technician 109, the individual reduced video windows 122 become enlarged video windows 121 to facilitate observation of details. The mobile field technicians 102 could signal their desire to audibly communicate with the local master technician by an electronic signal, such as a flashing light or icon, within their reduced video windows 122. The local station software would also track the time each individual mobile field technician 102 was on-line and transmitting data. Where appropriate, the local processor 110 may perform data compression, error detection and correction for audio and video signals transmitted from the mobile field technician 102 via the wireless portable processor 103.

In an alternative embodiment, the local station 108 is comprised of a local master technician 109 utilizing a wireless portable processor 103 to communicate with one or more mobile field technicians 102. The term "local master technician" is not to necessarily imply that the local master technician 109 is constantly in a fixed location, but may himself/herself be mobile. Similarly, the term "mobile field technician" is not to necessary imply that the mobile field technician is continually moving, but may himself/herself, be at a fixed job site for a varying period of time.

In a preferred embodiment, the local station software would comprise the 3.0 cu-see-me product by Whitepines Inc. of 542 Amherst Street, Naushua, N.H. 03063.

In a preferred embodiment, the local processor 110 would comprise the PC300GL product by IBM of San Jose Calif.

In a preferred embodiment, the local processor web browser 118 would comprise the Netscape 4.0 product by Netscape Inc. of 501 E. Middlefield Road, Mountain View, Calif. 94043.

In a preferred embodiment, the operator headset would comprise the SP-NCHSM-776 product by Specialty Products of P.O. box 30665 Reno, Tex. 75462.

The local station data interface 123 is any connecting point that couples the local processor 110 to the wireless network 106 and/or the Internet 107. It could be a standard POTS telephone line, an ISDN line, dedicated T1, fiber optic, satellite, broad band RF or wireless microwave broad band. It would be clear to those skilled in the art that these different methods would be workable with the disclosure of the present invention, and would not require any undo invention.

In a preferred embodiment, the local station data interface 123 would comprise a dedicated ISDN line to allow for adequate data transmission to and from the local processor 110 from the wireless network 106.

THE WIRELESS NETWORK

The wireless network may comprise any wireless link capable of carrying sufficient information between the wireless portable processor 103 and the local processor 110 such as a CDPD cellar network, TDMA, CDMA, ARDIS, RAM, spread spectrum RF, satellite and/or broad band microwave. In a preferred embodiment, the wireless network 106 comprises the CDPD cellular network coupled to an Internet service provider. However, the wireless network 106 could be utilized as a direct communication link between the wireless portable processor 103 and the local processor 110 without using the Internet 107. It would be clear to those skilled in the art that these alternative wireless networks would be workable with the disclosed invention, without any undo invention.

VEHICLE BASED PORTABLE PROCESSOR

Figure 4:
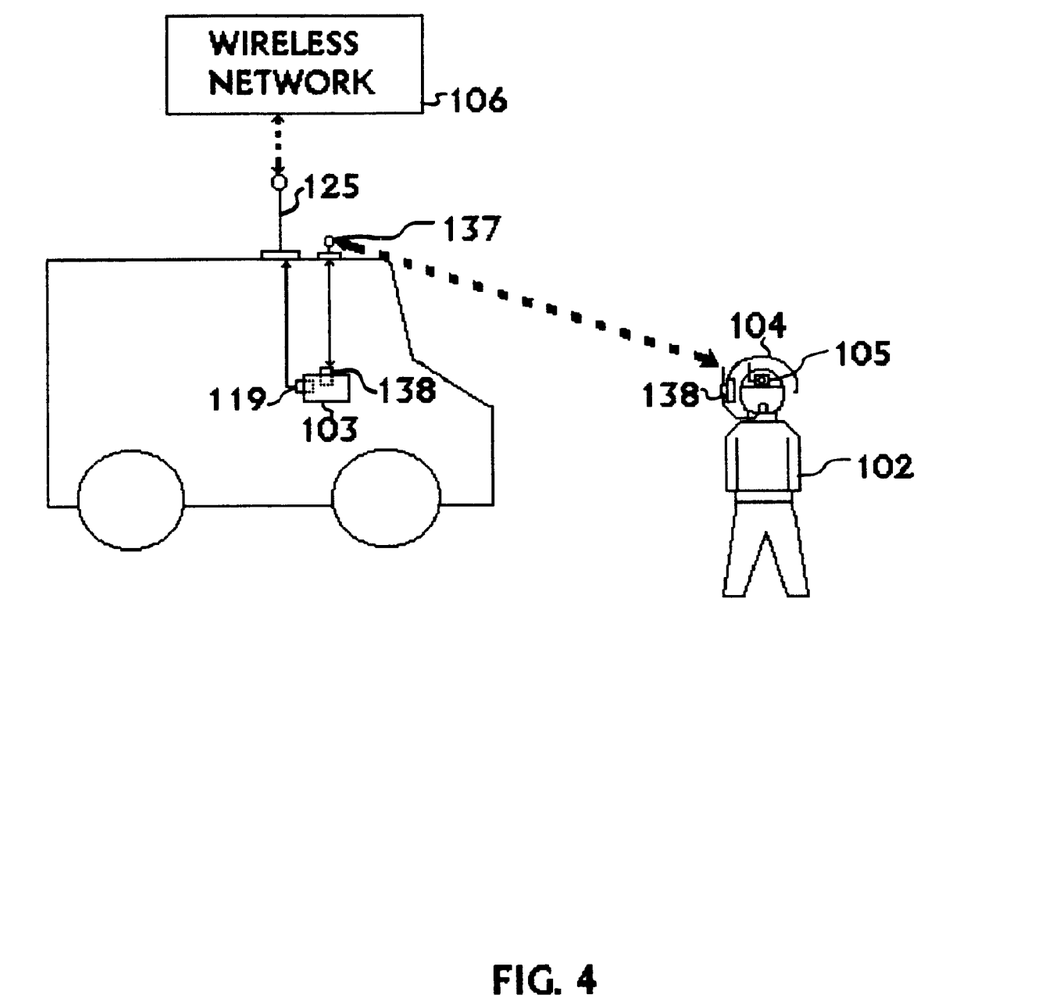
FIG. 4 shows a block diagram of a vehicular based portable processor for a remote system.

FIG. 4 shows a block diagram of a vehicle based wireless remote system

The vehicle based wireless remote system comprises a wireless portable processor 103 a vehicular mounted wireless network antenna 125 and a vehicular mounted RF antenna 137. The mobile field technician 102 would move about a job site while transmitting/receiving audio and video data. The camera 105 and the wireless earphone headset 104 would transmit/receive data via a dual channel audio/video transceiver 138 mounted either on the wireless earphone headset 104 or alternatively on a belt or back pack. The dual channel audio/video transceiver 138 would relay the audio/video data by a wireless means to a vehicular mounted RF antenna 137 which would be coupled to a dual channel audio/video transceiver 138 coupled to or embedded with the wireless portable processor 103. The wireless portable processor 103 would relay the audio/video data from the mobile field technician 102 to the wireless network 106 via the wireless modem 119 that would be coupled to a vehicular mounted wireless network antenna 125.

In a preferred embodiment, the dual channel audio/video transceiver 138 would comprise the GFI-1001 model by Polaris Industries of 470 Armour Drive, Atlanta, Ga.

CENTRALIZED EXPERTISE STATION

Figure 5:
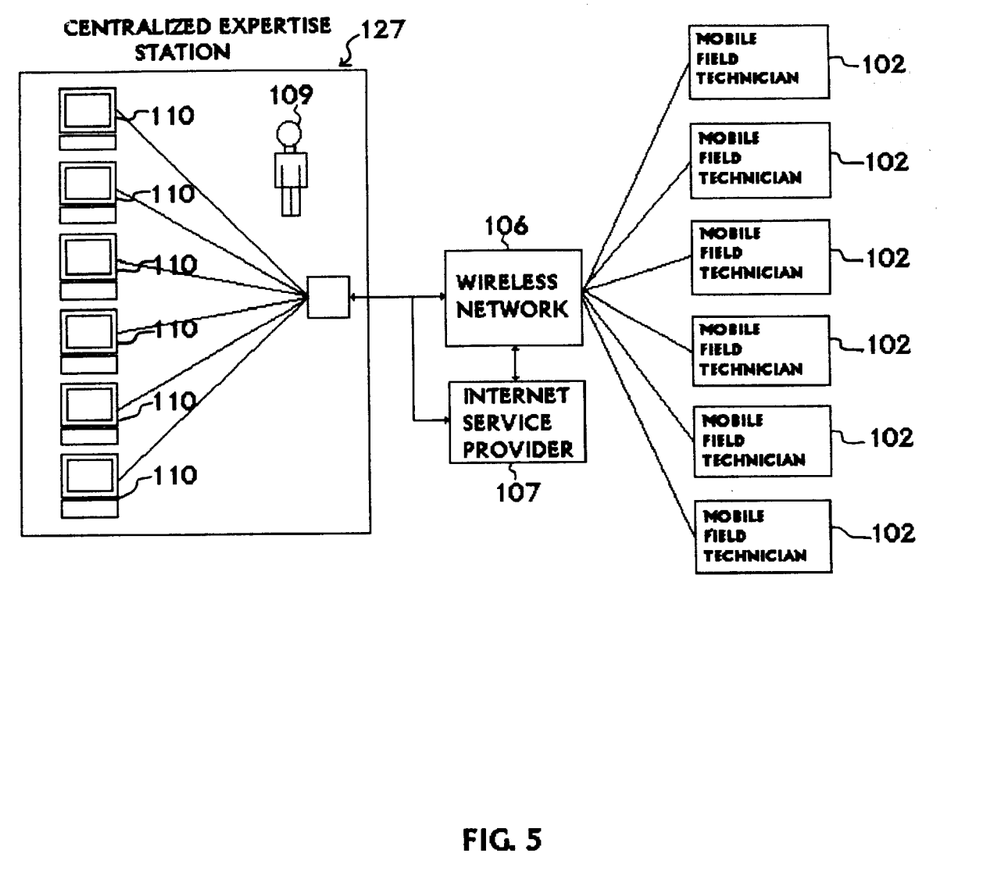
FIG. 5 shows a block diagram of a centralized expertise station coupled to multiple wireless portable remote systems.

FIG. 5 shows a block diagram of a centralized expertise station 127.

A centralized expertise station 127 is comprised of one or more local master technicians 109 and one or more local processors 110. The local master technicians 109 would guide and advise a plurality of mobile field technicians 102 via a wireless network 106 and/or the Internet 107. Alternatively, the mobile field technicians 102 need not be technicians at all but may be individuals only in need of the specialized information that the local master technician 109 is providing. Accordingly, the local master technicians 109 may not be technicians at all, but may be individuals with knowledge or knowledge resources sought by others. The centralized expertise station could be a knowledge resource for hire that was made accessible via the wireless remote apparatus 101. Alternatively, the centralized expertise station 127 could be a no-fee based center for information that was made accessible via the wireless remote apparatus 101.

In a preferred embodiment, the centralized expertise station 127 would comprise a plurality of local master technicians 109 who represent a variety of trades and/or have other specialized knowledge that is sought by individuals utilizing wireless portable processors 103. An individual that uses the wireless portable processor 103 could be a maintenance employee of an apartment project and require oversight and information that would be provided by a local master technician 109 that would allow the maintenance man to perform a repair. In a preferred embodiment, the maintenance personnel would couple to the centralized expertise station 127 via a wireless portable processor 103 coupled to the wireless network by a wireless means 106 and the Internet 107 and receive guidance and information from a local master technician 109 on a fee-for-use or contract basis.

METHODS OF OPERATION

Figure 6:
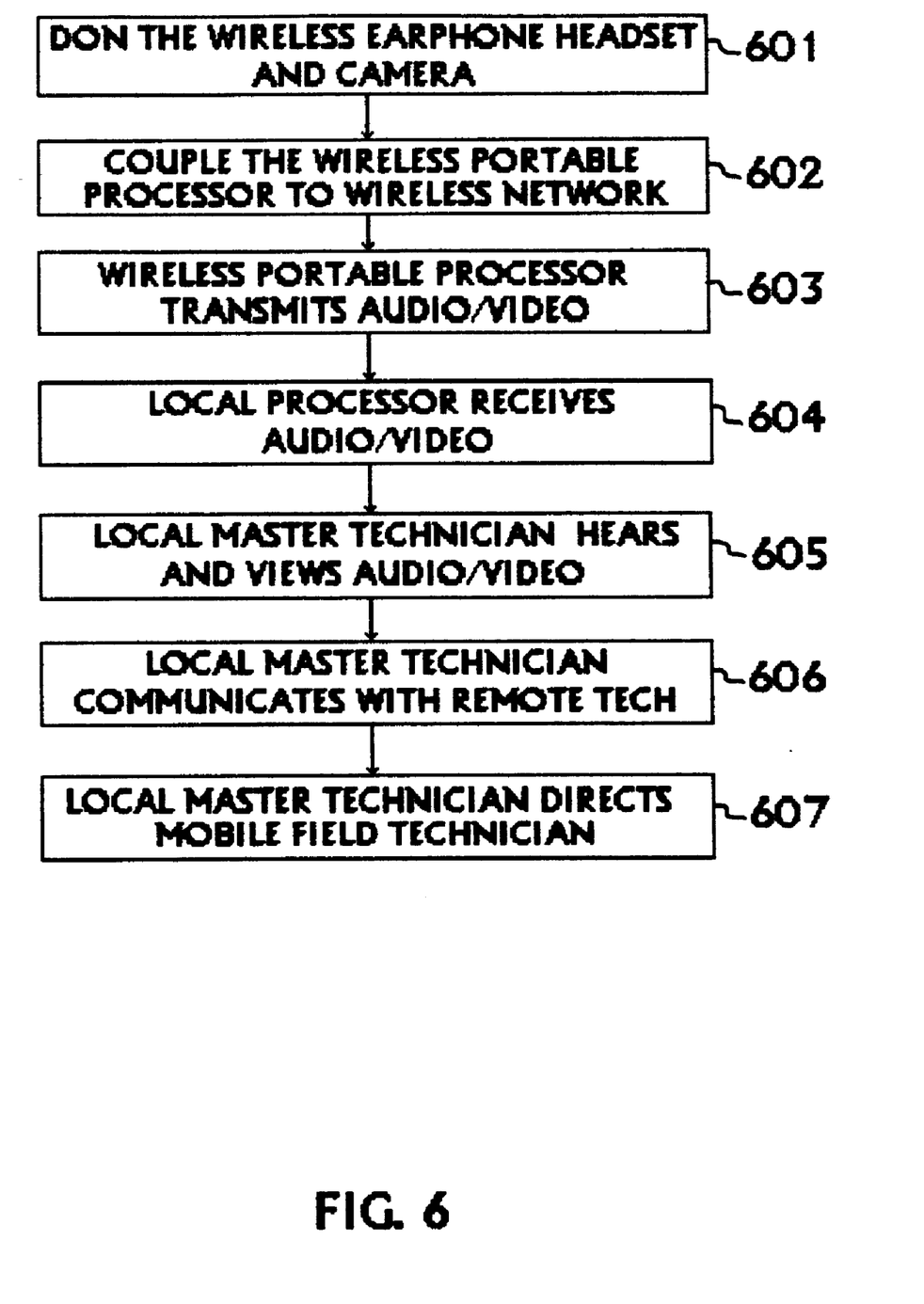
FIG. 6 shows a flow diagram of a method for operating a wireless remote system.

FIG. 6 shows a flow diagram of a method of operating a wireless remote system.

In a step 601, the mobile field technician 102 would don the wireless earphone headset 104 and a camera 105.

In a step 602, the mobile field technician 102 would couple the wireless portable processor 103 to the wireless network 106. In a preferred embodiment, the mobile field technician 102 would couple the wireless portable processor 103 to the cellular network and connect to the Internet 107.

In a step 603, the wireless portable processor 103, transmits audio/video to the local station 108 via the wireless network 106.

In a step 604, the local processor 110 receives the audio/video from the mobile field technician 102.

In a step 605, the local master technician 109 dons the operator headset 111 and views the computer monitor on the local processor 110 and hears and views the audio/video data transmitted from the mobile field technician 102 via the wireless portable processor 103 and the wireless network 106. In a preferred embodiment, the local master technician 109 would view the video data from the camera 105 in on-screen video windows that can be enlarged for better detail observation and reduced in order to view multiple field technician video windows at the same time. In a preferred embodiment, the local processor 110 would use the White Pines 3.0 video conference software.

In a step 606, the local master technician 109 communicates verbally with the mobile field technician 102 using the local station microphone 134 and the local station earphones 135 that comprise the operator headset 111.

In a step 607, the local master technician 109 directs the mobile field technician 102.

Although this preferred method of operation is disclosed with regard to a technician and an expert, collectively performing the task of troubleshooting remote apparatus, it would be clear to those skilled in the art, after perusal of this application, that there are many alternative tasks that may be performed by the mobile field technician 102, with the assistance of the local master technician 109, using substantially the same method and system. Moreover, it would be clear to those skilled in the art, after perusal of this application, how to modify the system disclosed herein, and known equipment, to implement such alternative tasks without undue invention.

For example, the following are alternative embodiments of the invention:

1. The mobile field technician 102 may not be a technician at all but is only an individual in need of information that would be provided via the wireless portable processor 103.
2. The local master technician 109 may not be a technician at all but may simply be an information provider via the wireless remote system.
3. The mobile field technician 102 may not wear or carry the wireless portable processor 103 but would transmit audio/video to a vehicle located processor (FIG. 4) that would relay the audio/video from the wireless earphone headset 104 and the wireless camera 105 to the wireless network 106 via a wireless network antenna 125.
4. The mobile field technician 102 may not wear the camera 105 but would alternatively set the camera on a stationary platform in a manner as to observe the desired area or object. The camera 105 would transmit the video utilizing an attached wireless video transmitter to the wireless portable processor 103 or alternatively to a vehicle located processor as shown in FIG. 4.
5. The mobile field technician 102 may not transmit audio via the wireless portable processor 103 at all but would alternatively transmit/receive audio via a cell phone.

6. The local station 108 may alternatively be a centralized expertise station 127 where a plurality of master technicians 109 would advise a plurality of mobile field technicians 102. The local master technicians 109 may represent different trades or areas of expertise and may offer that expertise on a fee or contract basis. Alternatively, the local master technicians 109 may not be technicians at all but simply information providers or allow access to information in a fee based or non fee based environment via the wireless portable processor 103.

7. The local master technician 109 may alternatively utilize a wireless portable processor 103 to advise one or more mobile field technicians 102 using wireless portable processors 103. The local master technician 109 may be at the same location or job site but find it necessary to advise one or more technicians that may be separated from each other or separated from the local master technician 109 or otherwise in need of instruction. An example would be a local master technician 109 advising mobile field technicians that are on a building roof while local master technician may be on the first floor.

ALTERNATIVE EMBODIMENTS

Although preferred embodiments are disclosed herein, many variations are possible which remain within the concept, scope and spirit of the invention, and these variations would become clear to those skilled in the art after perusal of this application.

What is claimed is:

1. A system, comprising:

a wireless remote system disposed to be operated by a mobile field operator, said wireless remote system comprising an audio sensor, a video sensor, a wireless portable processor, an audio receiver and a wireless transceiver, wherein the audio sensor, the video sensor, the audio receiver and wireless transceiver move with the mobile field operator;

a local station disposed to be operated by a local master technician, said local station comprising an audio sensor, a video receiver, a processor and an audio receiver;

a wireless communication network coupled to said local station and said wireless remote system, wherein said wireless remote system audio sensor and said local station audio receiver are disposed to recover remote sound and deliver said remote sound to said local master technician, said wireless remote system video sensor and said local station monitor are disposed to recover remote images and deliver remote images to said local master technician, and said local station audio sensor and said wireless remote system receiver are disposed to recover local sound and deliver said local sound to said mobile field operator, and wherein said local master technician may view and hear stimuli available to said mobile field operator, said local master technician and said mobile field operator are capable of communicating, and said local master technician can directly advise said mobile field operator and wherein said local station is comprised of a plurality of said local processors operated by a plurality of said local master technicians advising a plurality of said mobile field operators.

2. A system as in claim 1, wherein:

the wireless remote system further comprises a monitor, a web browser, a codec and a wireless modem; and the local station further comprises a web browser and a codec; and wherein said wireless communication network is coupled to a computer network.

3. A system as in claim 1, wherein said wireless portable processor is located in a vehicle and is disposed to relay said wireless remote system audio sensor and said wireless remote system video sensor data to said local station processor and viewed by said local master technician.

4. A system as in claim 1, wherein said local master technician and said mobile field operator are physically separated by a substantial distance.

5. A system as in claim 1, wherein said wireless remote system video sensor is coupled by a wireless means to said wireless portable processor.

6. A system as in claim 1, wherein said wireless remote system audio sensor is coupled by a wireless means to said wireless portable processor.

7. A system as in claim 1, wherein said wireless remote system is coupled by a wireless mean to said wireless communication network via a cellular phone.

8. A system as in claim 1, wherein said wireless remote system audio sensor is coupled by a wireless means to said wireless communication network via a cellular phone.

9. A system as in claim 1, wherein said mobile field operator is a technician.

10. A system as in claim 1, wherein said video sensor is disposed to detect full spectrum light waves.

11. A system as in claim 1, wherein said wireless remote system is adapted to be coupled by a wireless means to said communication network while in an underwater environment.

12. A method for providing assistance to a mobile field operator by a local master technician, comprising the steps of:

operating a wireless remote system by the mobile field operator, said wireless remote system comprising an audio sensor, a video sensor, a wireless portable processor, an audio receiver and a wireless transceiver, wherein operating the wireless remote system comprises moving the audio sensor, the video sensor, the audio receiver and wireless transceiver with the mobile field operator;

operating a local station by a local master technician, said local station comprising an audio sensor, a video receiver, a processor and an audio receiver;

communicating over a wireless network between said local station and said wireless remote system, delivering remote sound from said wireless remote system audio sensor to said local station audio receiver;

delivering remote images from said wireless remote system video sensor to said local station monitor;

delivering local sound from said local station audio sensor to said wireless remote system receiver; and viewing and hearing by said local master technician of stimuli available to said mobile field operator;

communicating between said local master technician and said mobile field operator; and directly advising said mobile field operator by said local master technician.

13. A method as in claim 12, wherein said wireless portable processor is located in a vehicle, further comprising the step of relaying said wireless remote system audio sensor and said wireless remote system video sensor data to said local station processor.

* * * * *

(12) INTER PARTES REVIEW CERTIFICATE (135th)
United States Patent
Thomason (10) Number: US 6,317,039 K1
(45) Certificate Issued: May 16, 2016

(54) WIRELESS VIDEO AUDIO DATA REMOTE SYSTEM

(75) Inventor: John Allen Thomason (73) Assignee: WIRELESS REMOTE SYSTEM LLC

Trial Number:

IPR2014-00369 filed Jan. 21, 2014

Petitioner: Librestream Technologies, Inc.

Patent Owner: John A. Thomason

Inter Partes Review Certificate for:

Patent No.: 6,317,039
Issued: Nov. 13, 2001
Appl. No.: 09/175,112
Filed: Oct. 19, 1998

The results of IPR2014-00369 are reflected in this inter partes review certificate under 35 U.S.C. 318(b).

INTER PARTES REVIEW CERTIFICATE
U.S. Patent 6,317,039 K1
Trial No. IPR2014-00369
Certificate Issued May 16, 2016

AS A RESULT OF THE INTER PARTES REVIEW PROCEEDING, IT HAS BEEN DETERMINED THAT:

Claims 1-13 are cancelled.

\* \* \* \* \*